(12) United States Patent
Thetford et al.

(10) Patent No.: US 10,113,031 B2
(45) Date of Patent: Oct. 30, 2018

(54) AROMATIC DISPERSANT COMPOSITION

(71) Applicant: Lubrizol Advanced Materials, Inc., Cleveland, OH (US)

(72) Inventors: Dean Thetford, Norden (GB); Andrew J. Shooter, Wilmslow (GB); Robert A. Jennings, Salford (GB)

( * ) Notice: Subject to any disclaimer, the term of this patent is extended or adjusted under 35 U.S.C. 154(b) by 197 days.

(21) Appl. No.: 15/032,083

(22) PCT Filed: Oct. 21, 2014

(86) PCT No.: PCT/US2014/061456
§ 371 (c)(1),
(2) Date: Apr. 26, 2016

(87) PCT Pub. No.: WO2015/065753
PCT Pub. Date: May 7, 2015

(65) Prior Publication Data
US 2016/0264731 A1    Sep. 15, 2016

Related U.S. Application Data

(60) Provisional application No. 61/898,714, filed on Nov. 1, 2013.

(51) Int. Cl.
| | | |
|---|---|---|
| C08G 65/333 | (2006.01) | |
| C09D 7/65 | (2018.01) | |
| C09D 11/03 | (2014.01) | |
| C08G 65/26 | (2006.01) | |
| C08G 65/22 | (2006.01) | |

(52) U.S. Cl.
CPC ....... *C08G 65/33341* (2013.01); *C08G 65/22* (2013.01); *C08G 65/2618* (2013.01); *C08G 65/333* (2013.01); *C08G 65/33331* (2013.01); *C09D 7/65* (2018.01); *C09D 11/03* (2013.01)

(58) Field of Classification Search
None
See application file for complete search history.

(56) References Cited

U.S. PATENT DOCUMENTS

| | | | |
|---|---|---|---|
| 3,880,859 A * | 4/1975 | Scheuermann | C07D 221/14 546/98 |
| 5,128,393 A | 7/1992 | Peng et al. | |
| 5,324,756 A | 6/1994 | Gebregiorgis et al. | |
| 5,424,346 A | 6/1995 | Simms et al. | |
| 5,688,312 A | 11/1997 | Sacripante et al. | |
| 5,852,123 A | 12/1998 | Huybrechts et al. | |
| 6,440,207 B1 | 8/2002 | Schulz et al. | |
| 7,265,197 B2 | 9/2007 | Huber et al. | |
| 7,312,260 B2 | 12/2007 | Krappe et al. | |
| 8,236,157 B2 | 8/2012 | Gebregiorgis | |
| 2005/0120911 A1 * | 6/2005 | Huber | C07D 209/48 106/31.49 |
| 2006/0089426 A1 | 4/2006 | Haubennestel et al. | |
| 2008/0047462 A1 | 2/2008 | Klein et al. | |
| 2008/0119613 A1 | 5/2008 | Klein et al. | |
| 2009/0221745 A1 | 9/2009 | Orth et al. | |
| 2010/0035958 A1 * | 2/2010 | Thetford | C07D 209/48 514/417 |
| 2010/0227950 A1 | 9/2010 | Nguyen et al. | |

FOREIGN PATENT DOCUMENTS

| | | |
|---|---|---|
| JP | 2013053200 A | 9/2011 |
| JP | 2012211228 A | 11/2012 |
| WO | 00012582 A1 | 3/2000 |
| WO | 2007139980 A1 | 12/2007 |
| WO | 2008018873 A1 | 2/2008 |
| WO | 2008028954 A1 | 3/2008 |
| WO | 2013165770 A1 | 11/2013 |
| WO | 2013165792 A1 | 11/2013 |

OTHER PUBLICATIONS

Simms, J.A.: "A new graft copolymer pigment dispersant synthesis" published in Progress in Organic Coatings 35, No. 1-4, (1999) 205-214 discloses grafting phthalimide onto an epoxide functional acrylate.

* cited by examiner

*Primary Examiner* — Robert S Loewe
*Assistant Examiner* — Ha S Nguyen
(74) *Attorney, Agent, or Firm* — Samuel B. Laferty; Teresan W. Gilbert

(57) ABSTRACT

The present invention relates to a composition containing a particulate solid, an organic or aqueous medium and a dispersant that may be a reaction product of an organic di or polyepoxide with a primary amine, aminoalcohol, amino acid, hydroxyacid or alcohol containing a fused or non-fused aromatic imide group. The invention further provides compositions for coatings, inks, toners, plastic materials (such as thermoplastics), plasticizers, plastisols, crude grinding and flush.

18 Claims, No Drawings

AROMATIC DISPERSANT COMPOSITION

CROSS REFERENCE TO RELATED APPLICATION

This application claims priority from PCT Application Serial No. PCT/US2014/061456 filed on Oct. 21, 2014, which claims the benefit of U.S. Provisional Application No. 61/898,714 filed on Nov. 1, 2013.

FIELD OF INVENTION

The present invention relates to a composition containing a particulate solid, an organic or aqueous medium and a polymer that may be a reaction product of an organic di or polyepoxide with a primary amine, aminoalcohol, amino acid, hydroxyacid, a diol or alcohol containing a fused or non-fused aromatic imide group. The invention further provides compositions for coatings, inks, toners, plastic materials (such as thermoplastics), plasticisers, plastisols, crude grinding and flush.

BACKGROUND OF THE INVENTION

Many formulations such as inks, paints, millbases and plastics materials require effective dispersants for uniformly distributing a particulate solid in an aqueous, a polar or a non-polar organic medium. For inks, it is desirable for ink manufacturers to generate printed products of high resolution and quality. The adaptability of printing process to cater for the ever widening range of base substrates, resins and pigments is a challenge. The pigment dispersion should be compatible with the different formulations used to ensure good adhesion and resistance of the final coating. Poor pigment dispersion or stabilisation can result in agglomeration or settling within the organic or aqueous liquid medium (e.g., ink, paint or coating) lowering the gloss and aesthetic appeal.

U.S. Pat. No. 7,265,197 (Huber et al., published 4 Sep. 2007) discloses dispersing pigments in ink compositions with a dispersant having formula:

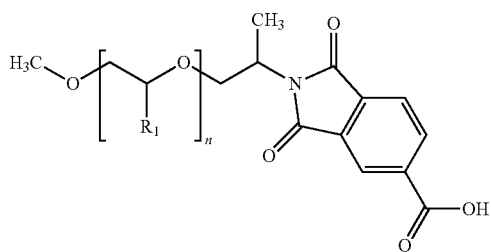

where $R_1$ is individually chosen from H and $CH_3$, and n is an integer from 4 to 400).

International publication WO 2008/028954 (Thetford, published 13 Mar. 2008) discloses imide dispersant compounds containing terminal acidic groups in both a polar and a non-polar organic medium, where the dispersant compound is represented by the structure

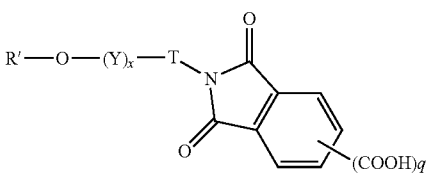

where T is —$(CH_2)_3$— or —$CH_2CH(CH_3)$—; R' is H or $C_{1-50}$-optionally substituted hydrocarbyl group, or $C_{1-50}$-optionally substituted hydrocarbonyl; Y is $C_{2-4}$-alkyleneoxy; x is 2 to 90; and q is 1 or 2, with the proviso that in Formula (1a), when q is 1, T is —$(CH_2)_3$—, and when q is 2, T is —$(CH_2)_3$— or —$CH_2CH(CH_3)$—.

U.S. Pat. No. 5,688,312 (Sacripante et al., published 18 Nov. 1997) discloses an ink composition comprised of a colourant and an imide or bisimide. The imide or bisimide may be prepared by reacting phthalic anhydride and a mono- or di-amine.

International Patent Application WO 2007/139980 (Romanova et al., published, 6 Dec. 2007) discloses a reaction product of at least one di-anhydride with at least two reactants which are different from each other, each of which reactants contains a primary or secondary amino, hydroxyl or thiol functional group, and at least one of which reactants is polymeric.

U.S. Pat. No. 6,440,207 (Schulz, published 27 Aug. 2002) discloses a process for preparing dispersible dry organic pigments for aqueous systems containing one or more aromatic polyalkylene oxide dispersants. The aromatic polyalkylene oxide dispersant may be prepared by reacting in an autoclave containing 250 g of deionized water 19.8 (0.100 mol) of 1,8-naphthalic anhydride and 105 (0.105 mol) of Jeffamine™ XTJ-506 (83 wt % ethylene oxide, 17 wt % propylene oxide).

International Patent application PCT/US13/038114, filed 25 Apr. 2013, entitled "Aromatic Dispersant Composition" (by Shooter, Thetford and Richards) discloses a polymer comprising a polymer chain having at least one aromatic imide pendant group.

International Patent application PCT/US13/037928, filed 24 Apr. 2013, entitled "Aromatic Dispersant Composition" (by Shooter, Thetford and Richards) discloses a polymer comprising a polymer chain having at least one fused aromatic imide pendant group.

U.S. Pat. No. 5,128,393 (Peng et al., published 7 Jul. 1992) discloses a pigment dispersant that is the reaction product of an organic monoepoxide or polyepoxide with a primary amine containing an imidazoline moiety.

U.S. Pat. No. 5,324,756 (Gebregiorgis, published 28 Jun. 1994) discloses a pigment dispersant that has an advantage of allowing for the high pigment to binder ratios and minimizes the volatile organic content (VOC) in an electrocoating composition.

U.S. Pat. No. 8,236,157 (Gebregiorgis, published 21 Oct. 2010) discloses a pigment dispersing resin consists essentially of the carboxylic acid salt of an aminated bisphenol epoxy resin and an alkoxylated styrenated phenol.

U.S. Pat. No. 7,312,260 (Krappe et al., published 27 Jan. 2005) discloses addition compounds suitable for use as wetting agents and dispersants and obtainable by reacting monofunctional or polyfunctional aromatic epoxides with polyoxyalkylenemonoamines.

US Patent Application 2006/0089426 (Haubennestel et al., published 27 Apr. 2006) discloses alkoxylated epoxide-amine adducts having a number-average molecular weight of more than 500 g/mol.

US Patent Application 2009/0221745 (Orth et al., published 3 Sep. 2009) discloses a compound suitable as a wetting and dispersing agent and obtainable from the reaction of A) polyepoxides with B) at least one aliphatic and/or araliphatic primary amine, and C) a modified polyalkoxylate isocyanate to form a urethane.

US Patent Application 2008/0047462 (Klein et al., published 28 Feb. 2008) discloses a composition of matter useful as an ink, which composition comprises a solvent, a pigment, and an effective pigment-dispersing amount of a water-soluble dispersant of a given structure.

US Patent Application 2008/0119613 (Klein et al, published 22 May 2008) discloses water-soluble products formed by reacting a monofunctional, amine-terminated polyether with a glycidyl ether of a polyol.

US Patent Application 2010/0227950 (Nguyen et al., published 9 Sep. 2010) discloses a pigment component, an effective pigment-dispersing amount of a dispersant of the given formula.

U.S. Pat. No. 5,852,123 (Huybrechts, published 22 Dec. 1998) discloses polymeric dispersant for pigments based on an acrylic graft copolymer wherein the graft copolymer has at least about 1 weight percent of an imide or urea functional dispersing substituent attached to the backbone, the macromonomer, or both the backbone and the macromonomer.

International publication WO 00/12582 A (Simms et al., published 9 Mar. 2000) discloses a polymeric pigment dispersant of a graft polymer having an acrylic polymer backbone and pending from the backbone, polyester side chains, cyclic imide groups and quaternary ammonium groups.

Japanese patent application JP2013-053200A (Tanaka et al., published 2 Sep. 2011) discloses dispersions comprising cyclic imide-containing aqueous polyurethanes as dispersing resins, pigments, and dispersants.

U.S. Pat. No. 5,424,346 (Simms et al., published 13 Jun. 1995) discloses polyester/acrylic comb polymers which are the reaction product of 20-85% of a carboxylic functional polyester copolymer, 10-50% of an oxirane substituted acrylic copolymer, and 2 to 20% of an imide compound having an isoindolino group.

Japanese Patent Application JP2012-211228 A (Murakami et al., published 1 Nov. 2012) discloses a A-B block copolymer having MW 500-5,000. The polymer block A constitutes methacrylic acid a constituent at least, and polymer block of B has two or more carboxyl groups, Journal article entitled "A new graft copolymer pigment dispersant synthesis" published in Progress in Organic Coatings 35 (1999) 205-214 discloses grafting phthalimide onto an epoxide functional acrylate.

SUMMARY OF THE INVENTION

One objective of the present invention is to provide compounds that are capable of improving the colour strength or other tinctorial properties, increasing a particulate solid load, and/or forming improved dispersions, having improved brightness of the final composition while also producing a composition with reduced viscosity, good dispersion stability, reduced particle size and reduced particle size distribution (typically reduced to an average of 150 nm or less, for example in the range of 70-135 nm), reduced haze, improved gloss, and increased jetness (especially when the composition is black). The composition of the present invention may also be stable under ambient storage, and high temperature storage conditions.

Electron withdrawing groups are well known to a person skilled in the art of organic synthesis. Examples of electron withdrawing groups include, but are not limited to a halogen (such as —Cl, —Br, or —F), a nitrile, a carbonyl group, a nitro group, a sulphamoyl group, a sulphonate group, a hydroxy group, or an amino group.

The electron withdrawing group may be either an activating group or a deactivating group.

The activating group may include a hydroxy group, an amino group, or a halogen. Typically, the activating group may include halogen such as —Cl or —Br.

The deactivating group may include a nitrile, a carboxyl group, a nitro group, a sulphamoyl group, or a sulphonate group. Typically, the deactivating group may include a nitro group, a carboxyl group or a sulphonate group.

Typically, the electron withdrawing group may be a deactivating group.

The invention provides a polymer of Formula (1):

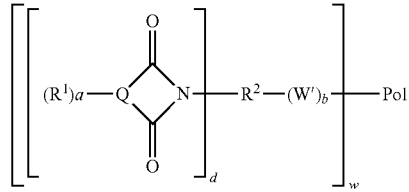

Formula (1)

wherein dispersant of Formula (1) has a terminal and/or pendant imide group, wherein the side chain imide group is derived from an imide compound represented by Formula (1a):

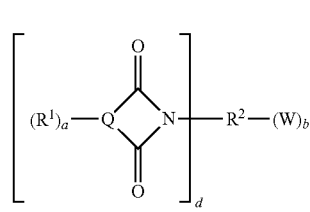

Formula (1a)

wherein
$R^1$ may be a substituent on Q ring in any position available for bonding to a substituent group and $R_1$ may be independently represented by one or more of —H, or an electron withdrawing group (such as —$NO_2$, —$SO_2NR'_2$, —C(O)R', —$SO_3M$, halo e.g., —Cl or —Br, —$NH_2$, or —OR'), or an electron releasing group (such as an alkyl group e.g., —$CH_3$), (typically when $R^1$ may be other than —H, the number of non-H groups defined by a may be 0 to 2, 0 to 1, 0, or 1). For example, $R^1$ may be —H, —$CH_3$, —Cl, or —Br, —$NO_2$, —$SO_3M$, or —CN (typically when a may be non-zero $R^1$ may be —Cl, —Br, —$SO_3M$ or —$NO_2$); M may be H, a metal cation, $NR'_4$, or mixtures thereof; R' may be —H, an optionally-substituted alkyl typically containing 1 to 20, or 1 to 10 carbon atoms, and the substituent may be hydroxyl or halo (typically Cl or Br) or mixtures thereof;
Q may be a fused or non-fused aromatic ring containing $4n+2\pi$-electrons, wherein n=1 or more, (typically 1 to 3, or 1 to 2, or 1, or 2), and Q may be bonded to the imide group in such a way to form a 5 or 6 membered imide ring (typically 5 membered); $R^2$ may be a $C_1$ to $C_{20}$, or $C_1$ to $C_{12}$, or $C_1$ to $C_6$ hydrocarbylene group (when $R^2$ contains more than 2 carbon atoms, the hydrocarbylene group may be linear or branched) or mixtures thereof; $R^2$ may include oxygen and/or nitrogen atoms wherein there is at least 2 carbon atoms per every oxygen or nitrogen of $R^2$, these would include ether, ester, and amide type linkages in $R^2$; Pol may be a diepoxide or polyepoxide comprising at least one pendant side chain (typically pendant side chains) of one or more of:
 a polyether,
 a polyester,
 a mixed polyether/polyester pendant side chains thereof, wherein the polyester group bonds to the polymer]
 a mixed polyester/polyether pendant side chains thereof, [wherein the polyether group bonds to the polymer]
 or mixtures thereof;
the bond(s) between Pol and each W' allows for one or more terminal and/or pendant side chain imide groups (as defined by w) to be attached to Pol at one or more locations on Pol and for each imide group to be attached to Pol by one or more bond (as defined by b);
W may be any group capable of reaction with an epoxide group, for example primary and secondary amine, carboxylic acid and hydroxyl groups;
W' represents amino, carboxylic acid and hydroxyl with the H missing and typically is a residue of the reaction of an amino, hydroxyl or carboxyl group, typically amino or hydroxyl of the imide containing group with a diepoxide or polyepoxide in a conventional reaction forming a chemical bond between an amino, hydroxy, or carboxyl group with an epoxide; when b is 2 then one of the W' may be derived from a secondary amine reacted with said epoxide and be in the $R^2$ linking group between the imide and the other W' group, when b is 2 each W' group may be the same or different;
b may be 1 or 2 and when b is 1, the imide group can either be terminal and attached to the Pol by one chemical bond when W is hydroxyl or carboxylic acid, or a pendant side chain when W is $NH_2$ and when b is 2 the imide group is a side chain attached to Pol by two chemical bonds;
d may be 1, 2, or 3; 1 or 2, or 1; this means that there is the possibility of 1 to 3 imide groups attached to $R^2$ at different carbon atoms of $R^2$; and
w may be 1 or more, or 2, 3, or 4 to 100, or 2, 3, or 4 to 25, or 4 to 20.

In one embodiment the substituent(s) $R^1$ on the aromatic ring (Q) portion of the aromatic imide do not form a second heterocyclic ring and in particular neither form a second imide nor anhydride of a dicarboxylic acid.

The polymer in a further embodiment may contain other pendant solubilizing chains of a polyester, a polyether, a polyether/polyester, a polyester/polyether or combinations thereof.

In one embodiment, the polymer of the present invention (typically represented by Formula (1)) may be obtained/obtainable by a process comprising reacting an organic di or polyepoxide with a primary amine, an aminoalcohol, an amino acid, a hydroxyacid, a diol, or an alcohol, wherein the primary amine, aminoalcohol, amino acid, hydroxyacid, diol, or alcohol contain a fused or non-fused aromatic imide group. The reaction to form the imide may be carried out at a sufficiently high temperature known to the skilled person to favour imide formation e.g., at least 100° C., or 120° C. or 150° C. to 200° C.

DETAILED DESCRIPTION OF THE INVENTION

The present invention provides a polymer composition disclosed herein.

As used herein reference to hydrocarbylene groups may be linear or branched, and saturated or unsaturated.

The polymer of Formula (1) may have a number average molecular weight of 1,000 to 100,000, or 1,000 to 50,000, or 1,000 to 30,000, or 2,000 to 25,000.

The number average molecular weight may be determined for a pre-prepared polymer chain by GPC analysis. The number average molecular weight of a polymer that is prepared in-situ i.e., the polymer chain is grown off the imide group may be calculated by determining the degree of polymerisation (DP) which is proportional to the ratio of monomer [M] and initiator [I] (the initiator being the aromatic anhydride), and calculated by the formula DP=[M]/[I]. Nuclear magnetic resonance (NMR) may be used to determine the degree of polymerization and thus to calculate number average molecular weight of the polymeric group or polymer segment of the molecule.

Examples of a hydrocarbylene group defined by $R^2$ may include methylene, ethylene, propylene, butylene, pentylene, hexylene, octylene, decylene, dodecylene or their branched isomers. In one embodiment, hydrocarbylene group defined by $R^2$ may be $(-CH_2-)_3$ or $-CH_2CH(CH_3)-$ or $-CH_2CH_2-$.

$R^2$ may be derived from an aminoalcohol, an aminocarboxylic acid, or an amine having 1 to 3, or 1 to 2, or 1 —$NH_2$ group. The amino group may or may not contain additional alkyl groups.

Imide of Formula (1a)

The imide represented in Formula (1a) may be prepared by the reaction of an aromatic anhydride with an amino alcohol, a di- or polyamine, an aminocarboxylic acid or combinations thereof.

Examples of typical aminoalcohols used to prepare imides of Formula (1a) may be ethanolamine, 3-amino-1-propanol, 4-aminobutanol, 2-aminobutanol, 2-amino-2-methyl-1-propanol, 5-amino-1-pentanol, 5-amino-2-pentanol, 2-amino-3-methyl-1-butanol, 6-amino-1-hexanol, 2-amino-1-hexanol, serinol, 4-amino cyclohexanol, 2-(2-aminoethoxy)ethanol, 3-aminopropane-1,2-diol, 2(3-aminopropylamino)ethanol, 1,3-diamino-2-propanol, 2-amino-2-methyl-1,3-propanediol or mixtures thereof.

Examples of typical di- or polyamines used to prepare imides of Formula (1a) include 1-methyl-1,3-propanediamine, n-methylene ethylene diamine, 1,2-diamino ethane, propane-1,3-diamine, butane-1,4-diamine, pentane-1,5-diamine, hexane-1,6-diamine, dodecane-1,12-diamine, diethylenetriamine, triethylene tetraamine or mixtures thereof. They may be prepared by the reaction of an anhydride with a diamine such as ethylene diamine as described in Dalton Transactions, 2003, 4537-4545.

Examples of typical aminocarboxylic acid (or aminoacid) used to prepare imides of Formula (1a) may be an amino-$C_{2-20}$-alk(en)ylene carboxylic acid and may or may not contain more than one carboxylic acid group and may or may not contain more than one amino group. The aminocarboxylic acid may or may not contain other groups containing heteroatoms such as hydroxyl groups. The alk(en)ylene group may be linear or branched. The alk(en)ylene group of the amino carboxylic acid contains not greater than 12 carbon atoms. Specific examples include 11-amino undecanoic acid, 12-amino dodecanoic acid, 6-amino caproic acid, 4-aminobutyric acid, aspartic acid, glutamic acid, lysine, asparagine, glutamine, threonine, serine, cysteine, β-alanine, glycine, and sarcosine. Mixtures of amino carboxylic acids may be used. Examples of aminocarboxylic acid include 11-aminoundecanoic acid, 12-aminododecanoic acid, 6-aminocaproic acid, 4-aminobutyric acid, β-alanine, glycine, and sarcosine or mixtures thereof.

The technical feature defined within Q of 4n+2 π-electrons is well known to a skilled person as Hückel's rule. Typically, n may be equal to 1 (i.e., the number of π-electrons is 6), or 2 (i.e., the number of π-electrons is 10).

Typically, Q is based on phthalic anhydride (for benzene) or methyl-substituted phthalic anhydride (for toluene), 1,8-naphthalene anhydride, or 1,2-naphthalene anhydride, or mixtures thereof. In one embodiment, Q is based upon 1,8-naphthalene anhydride, or 1,2-naphthalene anhydride.

Q may be based on a phthalic anhydride such as phthalic anhydride (when $R^1$=H), 4-nitro-phthalic anhydride or 3-nitro-phthalic anhydride (when one $R^1$=$NO_2$), 4-chloro-phthalic anhydride, or 3-chloro-phthalic anhydride (when one $R^1$=Cl) group, 4-sulpho-phthalic anhydride or 3-sulpho-phthalic anhydride (when one $R^1$=$SO_3H$), tetrachloro and tetrabromo phthalic anhydrides, 3-bromo phthalic anhydride, 4-bromo phthalic anhydride, or mixtures thereof.

Q may be based on a naphthalene anhydride such as 4-nitro-1,8-naphthalic imide or 3-nitro-1,8-naphthalic imide (when one $R^1$=$NO_2$), 4-chloro-1,8-naphthalic imide (when one $R^1$=Cl) group, 4-sulpho-1,8-naphthalic imide or 3-sulpho-1,8-naphthalic imide (when one $R^1$=$SO_3H$), or mixtures thereof.

In one embodiment, when $R^1$ is other than H, the number of non-H groups defined by a may be 1 or 2. When $R^1$ is other than H, the group defined by $R^1$ may be electron-withdrawing (such as —$NO_2$ group, —$SO_3M$ group or a halo group, typically —Cl, or —Br), typically electron-withdrawing. When $R^1$ is electron-withdrawing, the $R^1$ may be either meta-substituted or para-substituted relative to the imide group or mixtures thereof. In one embodiment, the $R^1$ may be meta-substituted relative to the imide group.

In one embodiment, when $R^1$ is other than H, the number of non-H groups defined by a may be 0.

$R^1$ may typically be hydrogen.

R' may be an alkyl or optionally-substituted alkyl having an alkyl group that is linear or branched.

The alkyl groups defined by R' include methyl, ethyl, propyl, butyl, pentyl, hexyl, heptyl, 2-ethylhexyl, nonyl, decyl, undecyl, dodecyl, tridecyl, tetradecyl, pentadecyl, hexadecyl, heptadecyl, octadecyl, nonadecyl, eicosyl, or mixtures thereof. In one embodiment, R' may be derived from an alkanol.

In one embodiment, the imide represented by Formula (1a) may be obtained/obtainable by a process comprising:

reacting (i) an amino acid or (ii) an aminoalcohol, or (iii) a diamine or polyamine, with an aromatic di-acid or anhydride or other acid-forming derivative (such as di-ester, di-amide, di-acid dichloride) to form an acid-functionalised aromatic imide or a hydroxyl-functionalised aromatic imide, or an amino-functionalised aromatic imide respectively. The reaction to form the imide may be carried out at a sufficiently high temperature known to the skilled person to favour imide formation e.g., at least 100° C., or 120° C. or 150° C. to 200° C.

The imide may be prepared in the melt or in a solvent, at temperatures between 100-200° C. The synthesis may involve a volatile solvent (bpt<100° C.) to improve mixing of reagents, and the solvent is then removed by distillation as the temperature is raised above the boiling point of the solvent.

The imide of Formula (1a) is prepared in the solvent to avoid isolation of this intermediate. The maximum reaction temperature depends on the boiling point of the solvent used, examples of suitable solvents are toluene (bpt=110-111° C.), xylene (bpt=137-140° C.), propylene glycol monomethyl ether acetate (bpt=145-146° C.), dipropylene glycyol methyl ether acetate (bpt=200° C.), or mixtures thereof.

The imide of Formula (1a) is formed before reaction with the diepoxide or polyepoxide, if a mixture of amide and imide is present, the amide may convert to imide during the polymerisation process or after the polymerisation process by prolonged heating. A catalyst may be necessary to achieve high conversion of imide and some amide may still be present in the final product.

The process to prepare the polymer of Formula (1) of the present invention may be carried out in an inert atmosphere provided by any inert gas of the Periodic Table but typically nitrogen.

Polymer Embodiment 1

In one embodiment, the polymer of Formula 1 may be obtained/obtainable by a process comprising addition polymerisation by reacting:
(a) at least one compound of Formula (1a) wherein when b=1, W is a primary amine (—$NH_2$) giving pendant imide groups and/or W is a hydroxyl or carboxylic acid, giving a terminal end imide group, and/or when b=2, W is a secondary amino group (—NH—), hydroxyl or carboxylic acid or mixtures thereof giving a pendant imide group,
(b) with one or more diepoxide and/or polyepoxide and at least one member of the group consisting of a monofunctional polyetheramine of number average MW 250-3500, based on a polyether comprising units of $C_{2-8}$, typically $C_{2-4}$ alkylene oxides (such as ethylene oxide, propylene oxide, butylene oxide) or any combination thereof to give pendant polyether chains; and optionally
(c) in the presence of at least one member of a $C_{3-28}$ hydrocarbyl amine which may be substituted; or at least one of an aminoalcohol; or a mixture thereof.

In one embodiment, the process to prepare the polymer of Formula 1 further comprises the presence of the $C_{3-28}$ hydrocarbyl amine which may be substituted; or at least one of an aminoalcohol; or a mixture thereof. In a different embodiment, the process does not require the presence of the $C_{3-28}$ hydrocarbyl amine which may be substituted; or at least one of an aminoalcohol; or a mixture thereof.

The reaction of the diepoxide or polyepoxide with the various components may be carried out in solvent or in melt according to methods that are known to the skilled person. Amine groups will react with epoxides even at room temperature whilst hydroxyl and carboxylic acid groups require higher temperatures and optionally catalysts. Reaction temperatures of up to 160° C. may be required particularly for less reactive epoxides. The temperatures may vary between 40° C. and 150° C. are employed and catalysts may be used to accelerate the reaction. The catalyst may be chosen from any previously known prior art catalyst including phosphines, phosphonium salts, or quaternary ammonium salts.

Optionally the polymer may be prepared by further specifying one or more steps to further react any residual amino, hydroxyl, or epoxy groups. The further steps include:
a) reacting any terminal amino groups present with isocyanates, lactones, hydroxycarboxylic acids, anhydrides, cyclic carbonates, or (meth)acrylates;
b) salification and/or reaction of any amino groups with mono or polycarboxylic acids, mineral acids, phosphorus and polyoxometallate containing acids or strong acids;
c) oxidation of any amino groups present to nitrogen oxides;

d) quaternization of any amino groups present with alkylating agents;
e) reacting any hydroxyl groups present with isocyanates, phosphoric acid, polyphosphoric acid, anhydrides or carboxylic acids;
f) reacting any terminal epoxide groups present with secondary amines or carboxylic acids;
g) reacting any residual primary hydroxyl and amino groups present with lactones, hydroxycarboxylic acids, modified polyester isocyanate or any combination thereof to form pendant polyester chains, and optionally further reacting the hydroxyl end group of the polyesters chains derived from lactones and/or hydroxycarboxylic acids with modified polyether isocyanate to form block polyether/polyester pendant chains; or
reacting any hydroxyl and amino groups present with ethylene oxide, propylene oxide, butylene oxide, styrene oxide, modified polyether isocyanate or any combination thereof to form pendant polyether chains, and optionally further reacting the hydroxyl end group of the polyether chains derived from ethylene oxide, propylene oxide, butylene oxide, styrene oxide or mixtures thereof with modified polyester isocyanate to form block polyester/polyether pendant chains;
h) blending said addition polymer with a $C_{3-28}$ hydrocarbyl alkoxylate derived or obtainable from ethylene oxide, propylene oxide, butylene oxide, styrene oxide or mixtures thereof;
i) or any combination of a)-h) thereof.

Typically, the steps include at least one other step chosen from a), c), d), e), f) or g).

The diepoxide or polyepoxide may contain two or more epoxy groups per molecule. For example the diepoxide or polyepoxide may include diglycidyl ethers of $C_{1-100}$ aliphatic or aromatic diols. Examples of aliphatic polyepoxides are 1,4-butanediol diglycidyl ether, 1,6-hexanediol diglycidyl ether, epoxy resins of cycloalkyl diols commercially available under the tradename Eponex™ (ex Momentive) and those containing ether groups such as polyethylenglycol diglycidyl ether, polypropyleneglycol diglycidyl ether and polytetrahydrofuran diglycidyl ether which are available commercially under the tradename Grilonit® (ex EMS Griltech). Examples of aromatic polyepoxides include reaction products of diphenylolpropane with epichlorohydrin and their higher homologues and these are available commercially from Aldrich and under various tradenames such as D.E.R.™ (ex Dow), Epikote™ or Epon™ (ex Momentive) and Araldite® (ex Huntsman).

The monofunctional polyetheramine may be prepared by reacting a $C_{1-24}$ mono-hydrocarbyl alcohol initiator with ethylene oxide, propylene oxide or butylene oxide only or with mixtures thereof to form an alcohol-ended polymer chain, followed by conversion of the alcohol-ended polymer chain to an amine. The polyetheramine may be commercially available as the Surfonamine® amines or Jeffamine™ monoamines from Huntsman Corporation. Specific examples of Surfonamine® amines are B60 (ethylene oxide to propylene oxide ratio of 1 to 9), B100 (propylene oxide), B200 (ethylene oxide to propylene oxide ratio of 6 to 29), L-100 (propylene oxide to ethylene oxide mix ratio of 3/19), and L-207 (propylene oxide to ethylene oxide mix ratio of 10/32), L-200 (propylene oxide to ethylene oxide mix ratio of 4/41), and L-300 (propylene oxide to ethylene oxide mix ratio of 8/58). The figures in parentheses are approximate repeat units of propylene oxide, and ethylene oxide respectively. The monofunctional polyetheramine may be obtained by alkoxylation of aminoalcohols as is described in U.S. Pat. No. 5,879,445 (in particular the disclosure in column 2, line 50 to column 7, line 50).

The polyether chain of the polyetheramine may be a $C_{2-8}$-alkyleneoxy, or $C_{2-4}$-alkyleneoxy (most typical) homopolymer, or copolymer having random or block architecture. The polyether may have a chain that contains only one type of $C_{2-4}$-alkyleneoxy repeat unit or it may contain two or more different $C_{2-4}$-alkyleneoxy repeat units. When the chain represented by $(Y)_x$ contains two or more different $C_{2-4}$-alkyleneoxy repeat units the structure may be random or block.

In one embodiment, the polyether chain of the polyetheramine may comprise a $C_{3-4}$-alkyleneoxy group, —$CH_2$—$CH_2CH_2CH_2O$— or —$CH_2CH(CH_3)CH_2O$— or —$CH_2CH(CH_3)O$—. In another embodiment, the polyether chain may comprise —$CH_2CH_2CH(CH_3)O$— or —$CH_2$—$CH(CH_2$—$CH_3)$—$O$— group.

The polyether chain composition of the polyetheramine may vary depending on whether the polymer of the present invention is being used in polar, or non-polar, or aqueous medium. When the polymer of the present invention is used in aqueous medium, the polyether may contain greater than 50% by weight of ethylene oxide, or greater than 70% by weight, or greater than 80% by weight, or greater than 90% by weight.

When the polymer of the present invention is used in polar medium, the polyether may contain 0 to 50 wt %, 0 to 30 wt %, or 0 to 20 wt %, or 0 to 15 wt % of ethylene oxide and may contain 50 to 100 wt %, 70 to 100 wt %, or 80 to 100 wt %, or 85 to 100 wt % of propylene oxide and/or butylene oxide.

When the polymer of the present invention is used in non-polar medium, the polyether may contain propylene oxide and/or butylene oxide.

In one embodiment, the polyetheramine may contain a polyether chain of either (i) a polyethylene oxide homopolymer, or (ii) a polypropylene oxide homopolymer or (iii) a polybutylene oxide homopolymer or (iv) a copolymer of ethylene oxide and propylene oxide.

Examples for optional hydrocarbyl amines include $C_{3-28}$ aliphatic, arylalkyl, and heteroaromatic alkyl amines such as propylamine, butylamine, dibutylamine, 3-dimethylaminopropylamine, 3-aminopropylimidazole, 2-aminoethylmorpholine or mixtures thereof.

Examples for optional aminoalcohols include ethanolamine, 3-amino-1-propanol, 4-aminobutanol, 2-aminobutanol, 2-amino-2-methyl-1-propanol, 5-amino-1-pentanol, 5-amino-2-pentanol, 2-amino-3-methyl-1-butanol, 6-amino-1-hexanol, 2-amino-1-hexanol, serinol, 4-amino cyclohexanol, 2-(2-aminoethoxy)ethanol, 2-phenylamino ethanol, 2-benzylaminoethanol, 2-methyl amino ethanol, diethanolamine, 3-aminopropane-1,2-diol or mixtures thereof.

Polymer Embodiment 2

In a different embodiment, the polymer of Formula (1) may be obtained/obtainable by a process comprising addition polymerisation by reacting:
(a) at least one compound of Formula (1a) wherein when b=1, W is a primary amine (—$NH_2$) giving pendant imide groups and/or W is a hydroxyl or carboxylic acid, giving a terminal end imide group, and/or when b=2, W is a secondary amino group (—NH—), hydroxyl or carboxylic acid or mixtures thereof giving a pendant imide group, (b) with one or more diepoxide and/or polyepoxide and at least one member of a $C_{3-28}$ hydrocarbyl amine which may be substituted; or at least one of an aminoalcohol; or a mixture thereof; and
either or both of:
(c) reacting any residual primary hydroxyl and amino groups present from step (b) with lactones, hydroxycarboxylic acids, modified polyester isocyanate or any combination thereof to form pendant polyester chains, and optionally further reacting the hydroxyl end group of the polyesters chains derived from lactones and/or hydroxycarboxylic acids with modified polyether isocyanate to form block polyether/ester pendant chains; or
(d) reacting any hydroxyl and amino groups from step (b) with ethylene oxide, propylene oxide, butylene oxide, styrene oxide, modified polyether isocyanate or any combination thereof to form pendant polyether chains, and optionally further reacting the hydroxyl end group of the polyether chains derived from ethylene oxide, propylene oxide, butylene oxide, styrene oxide or mixtures thereof with modified polyester isocyanate to form block polyester/ether pendant chains.

Optionally, the polymer of the further embodiment may be prepared by further specifying one or more steps consisting essentially of:
a) reacting any terminal amino groups present with isocyanates, anhydrides, cyclic carbonates, or (meth)acrylates;
b) salification and/or reaction of any amino groups with mono or polycarboxylic acids, mineral acids, phosphorus and polyoxometallate containing acids or strong acids;
c) oxidation of any amino groups present to nitrogen oxides;
d) quaternization of any amino groups present with alkylating agents;
e) reacting any hydroxyl groups present with isocyanates, phosphoric acid, polyphosphoric acid, anhydrides or carboxylic acids;
f) reacting any terminal epoxide groups present with secondary amines or carboxylic acids;
g) blending said addition polymer with a $C_{3-28}$ hydrocarbyl alkoxylate derived or obtainable from ethylene oxide, propylene oxide, butylene oxide, styrene oxide, or mixtures thereof,
h) or any combination thereof.

The diepoxide or polyepoxide may contain two or more epoxy groups per molecule. For example the diepoxide or polyepoxide may include diglycidyl ethers of $C_{1-100}$ aliphatic or aromatic diols. Examples of aliphatic polyepoxides are 1,4-butanediol diglycidyl ether, 1,6-hexanediol diglycidyl ether, epoxy resins of cycloalkyl diols commercially available under the tradename Eponex™ (ex Momentive) and those containing ether groups such as polyethylenglycol diglycidyl ether, polypropyleneglycol diglycidyl ether and polytetrahydrofuran diglycidyl ether which are available commercially under the tradename Grilonit® (ex EMS Griltech). Examples of aromatic polyepoxides include reaction products of diphenylolpropane with epichlorohydrin and their higher homologues and these are available commercially from Aldrich and under various tradenames such as D.E.R.™ (ex Dow), Epikote™ or Epon™ (ex Momentive) and Araldite® (ex Huntsman).

The polyether chain composition of the polyether may vary depending on whether the polymer of the present invention is being used in polar, or non-polar, or aqueous medium. When the polymer of the present invention is used in aqueous medium, the polyether may contain greater than 50% by weight of ethylene oxide, or greater than 70% by weight, or greater than 80% by, or greater than 90% by weight.

When the polymer of the present invention is used in polar medium, the polyether may contain 0 to 50 wt %, 0 to 30 wt %, or 0 to 20 wt %, or 0 to 15 wt % of ethylene oxide and may contain 50 to 100 wt %, 70 to 100 wt %, or 80 to 100 wt %, or 85 to 100 wt % of propylene oxide and/or butylene oxide.

When the polymer of the present invention is used in non-polar medium, the polyether may contain propylene oxide and/or butylene oxide.

In one embodiment, the polyether may contain a polyether chain of either (i) a polyethylene oxide homopolymer, or (ii) a polypropylene oxide homopolymer or (iii) a polybutylene oxide homopolymer or (iv) a copolymer of ethylene oxide and propylene oxide.

Examples for hydrocarbyl amines include $C_{3-28}$ aliphatic, arylalkyl, and heteroaromatic alkyl amines such as propylamine, butylamine, dibutylamine, 3-dimethylaminopropylamine, 3-aminopropylimidazole, 2-aminoethylmorpholine or mixtures thereof.

Examples for aminoalcohols include ethanolamine, 3-amino-1-propanol, 4-aminobutanol, 2-aminobutanol, 2-amino-2-methyl-1-propanol, 5-amino-1-pentanol, 5-amino-2-pentanol, 2-amino-3-methyl-1-butanol, 6-amino-1-hexanol, 2-amino-1-hexanol, serinol, 4-amino cyclohexanol, 2-(2-aminoethoxy)ethanol, 2-phenylaminoethanol, 2-benzylaminoethanol, 2-methyl amino ethanol, diethanolamine, 3-aminopropane-1,2-diol or mixtures thereof.

In one embodiment, pendant polyether chains may be derived from the reaction of free hydroxyl or amino groups remaining in the addition compounds with ethylene oxide, propylene oxide, butylene oxide, styrene oxide, or mixtures thereof.

In one embodiment, pendant polyether chains may also be derived from the reaction of free hydroxyl and/or amino groups remaining in the addition compounds with modified polyether isocyanate. Modified polyether isocyanates may be prepared by reacting a $C_{1-24}$ mono-hydrocarbyl alcohol initiator with ethylene oxide, propylene oxide or butylene oxide or with mixtures thereof to form an alcohol-ended polymer chain, followed by reaction with an excess of diisocyanate to give a modified polyether isocyanate, excess diisocyanate being removed from the reaction mixture before reaction with the addition polymer, or reaction with a molar equivalent of asymmetric diisocyanate (i.e., a non-symmetrical diisocyanate compound) such that a less hindered isocyanate group preferentially reacts with the free hydroxyl and/or amino groups. Examples of diisocyanates used include alkylene, cycloalkylene and aralkylene diisocyanates such as hexamethylene di-isocyanate, isophoronedi-isocyanate, 4,4'-diphenylmethanedi-isocyanate, 2,4-tolylenedi-isocyanate and 2,6-tolylenedi-isocyanate, including mixtures thereof.

In one embodiment, pendant polyester chains may be derived from the reaction of free primary hydroxyl and/or amino groups remaining in the addition compounds with hydroxy carboxylic acids and/or lactones, especially those derived from the polymerisation of epsilon-caprolactone, ricinoleic acid, 12-hydroxystearic acid, delta-valerolactone, or mixtures thereof optionally in the presence of an esterification catalyst. The esterification catalyst may be chosen from any previously known prior art catalyst including tin (II) octanoate, tetra-alkyl titanate, for example, tetrabutyltitanate, zinc salt of an organic acid, for example, zinc acetate, zirconium salt of an aliphatic alcohol, for example, zirconium isopropoxide, toluene sulphonic acid or a strong organic acid such as trifluoroacetic acid, or phosphoric acid.

In one embodiment, pendant polyester chains may be derived from the reaction of free hydroxyl and/or amino groups remaining in the addition compounds with modified polyester isocyanate. Modified polyester isocyanate may be prepared by reacting a $C_{1-24}$ mono-hydrocarbyl alcohol initiator with lactones and/or hydroxycarboxylic acids to form an alcohol-ended polymer chain, followed by reaction with an excess of diisocyanate to give a modified polyester isocyanate, excess diisocyanate being removed from the reaction mixture before addition to the polyepoxide polymer, or reaction with a molar equivalent of asymmetric diisocyanate (i.e., a non-symmetrical diisocyanate compound). Examples of diisocyanates used include alkylene, cycloalkylene and aralkylene diisocyanates such as hexamethylene di-isocyanate, isophoronedi-isocyanate, 4,4'-diphenylmethanedi-isocyanate, 2,4-tolylenedi-isocyanate and 2,6-tolylenedi-isocyanate, including mixtures thereof.

In one embodiment, pendant polyether/polyester chains may be derived from the reaction of free primary hydroxyl and/or amino groups remaining in the addition compounds with hydroxy carboxylic acids and/or lactones as listed above followed by reaction with a modified polyether isocyanate.

In one embodiment, pendant polyester/polyether chains may be derived from the reaction of free hydroxyl and/or amino groups remaining in the addition compounds with ethylene oxide, propylene oxide, butylene oxide, or mixtures thereof, followed by reaction with hydroxy carboxylic acids, lactones, a modified polyester isocyanate or mixtures thereof as listed above.

INDUSTRIAL APPLICATION

In one embodiment, the invention provides a composition comprising a particulate solid, a non-polar organic medium, and a polymer described herein. The composition may be a millbase, paint or ink.

In one embodiment, the invention provides a composition comprising a particulate solid, a polar organic medium, and a polymer described herein. The composition may be a millbase, paint or ink.

In one embodiment, the invention provides a composition comprising a particulate solid, a non-polar organic medium, and the polymer described herein and the composition further comprises a binder. In one embodiment, the binder may be nitrocellulose, polyepoxide, polyurethane, alkyd, poly(meth)acrylate, polyester, or polyamide.

(a) In one embodiment, the invention provides a composition comprising a particulate solid, a polar organic medium, and a polymer having at least one aromatic imide group, wherein the polymer described herein further comprises a binder. In one embodiment, the binder may be nitrocellulose, polyurethane, poly(meth)acrylate, polyester, or polyamide.

(b) The present invention also provides a composition comprising a particulate solid (typically a pigment or filler), a non-polar organic medium and a polymer having at least one aromatic imide group, wherein the polymer described herein. The composition may be a millbase, paint or ink.

The present invention also provides a composition comprising a particulate solid (typically a pigment or filler), a polar organic medium and a polymer having at least one aromatic imide group, wherein the polymer described herein. The composition may be a millbase, paint or ink.

The particulate solid disclosed herein in a composition of the present invention may be a pigment or filler. The pigment may, in one embodiment, be an organic pigment.

The non-polar organic medium may for instance include a mineral oil, an aliphatic hydrocarbon, an aromatic hydrocarbon, a plastic material (typically a thermoplastic resin or a thermoset resin), or a plasticiser.

The polar organic medium may for instance include a ketone, an ester, a glycol ether and ester, or an alcohol.

In one embodiment, the invention provides a composition comprising a particulate solid, an organic or aqueous medium and a polymer of Formula (1).

In one embodiment, the invention provides a paint or ink comprising a particulate solid, a non-polar organic medium, a film-forming resin and a polymer of the invention disclosed herein.

In one embodiment, the invention provides a paint or ink comprising a particulate solid, a polar organic medium, a film-forming resin and a polymer of the invention disclosed herein. In one embodiment, the invention provides a paint or ink comprising a particulate solid, an aqueous medium, a film-forming resin and a polymer of the invention disclosed herein.

The ink may be an ink-jet ink, a flexo ink, a gravure ink, a phase change ink (or hot-melt ink) or an offset ink. The ink may be a radiation curable ink.

The phase change ink is a type of ink for ink-jet printer in which the ink begins as a solid and is heated to convert it to a liquid state. While it is in a liquid state, the ink drops are propelled onto the substrate from the impulses of a piezoelectric crystal. Once the ink droplets reach the substrate, another phase change occurs as the ink is cooled and returns to a solid form instantly. The print quality is excellent and the printers are capable of applying ink on almost any type of paper or transparencies. A description of a phase change ink is provided on the Digital Printing Tips website http://digitalprintingtips.com/default.asp, and specifically at http://digitalprintingtips.com/email-term/t--2725/phase-change-inkjet-printer.asp (as published on 29 Jul. 2013).

In one embodiment, the compositions disclosed herein further include a binder.

In one embodiment, the invention provides for a composition comprising a polymer described herein, an organic pigment, and a binder. The binder may be chosen from nitrocellulose, polyurethane and polyamide. The composition may be used in an ink for a printing process, such as a flexographic printing process or ink-jet inks such as radiation curable, non-impact and drop on demand.

In one embodiment, the invention provides for a composition comprising a polymer described herein, carbon black, and a binder. The binder may be chosen from nitrocellulose, polyurethane and polyamide. The composition may be used in an ink for a printing process, such as a flexographic printing process.

In one embodiment, the invention provides a composition comprising a polymer described herein, a particulate solid (typically a pigment or filler), and either (i) a polar organic medium, or (ii) a non-polar organic medium, or (iii) an aqueous medium, wherein the organic medium may be a plastics material. The plastic material may be a thermoplastic resin or a thermoset resin.

The polymer of the present invention may be present in a composition disclosed herein in an amount ranging from 0.1 wt % to 79.6 wt %, 0.5 wt % to 30 wt %, or 1 wt % to 25 wt % of the composition.

In one embodiment, the invention provides for the use of the polymer a polymer described herein as a dispersant in a composition disclosed herein.

In one embodiment, the invention provides for the use of a polymer described herein as a dispersant in an ink composition. The ink composition may have at least one of reduced particle size and reduced particle size distribution (typically reduced to an average of 150 nm or less), reduced haze, improved gloss, and increased jetness (especially when the composition may be black) and be stable under ambient storage, and high temperature storage conditions.

Without being bound by theory, it may be believed that the aromatic imide group may act as an anchor group between the polymer of invention and a particulate solid such as a pigment.

The particulate solid present in the composition may be any inorganic or organic solid material which is substantially insoluble in the organic medium at the temperature concerned and which it is desired to stabilize in a finely divided form therein. The particulate solids may be in the form of a granular material, a fibre, a platelet or in the form of a powder, often a blown powder. In one embodiment, the particulate solid is a pigment.

The particulate solid (typically a pigment or filler) may have an average particle size measured by light scattering measurements of from 10 nanometers to 10 microns, or 10 nanometers to 1, 2, 3, or 5 microns, or 20 nanometers to 1, 2, 3, or 5 microns in diameter.

Examples of suitable solids are pigments for solvent inks; pigments, extenders, fillers, blowing agents and flame retardants for paints and plastic materials; dyes, especially disperse dyes; optical brightening agents and textile auxiliaries for solvent dyebaths; pigments for inks, toners and other solvent application systems; solids for oil-based and inverse-emulsion drilling muds; dirt and solid particles in dry cleaning fluids; metals; particulate ceramic materials and magnetic materials for ceramics, piezoceramic printing, refactories, abrasives, foundry, capacitors, fuel cells, ferrofluids, conductive inks, magnetic recording media, water treatment and hydrocarbon soil remediation; organic and inorganic nanodisperse solids; metal, metal oxides and carbon for electrodes in batteries, fibres such as wood, paper, glass, steel, carbon and boron for composite materials; and biocides, agrochemicals and pharmaceuticals which are applied as dispersions in organic media.

In one embodiment, the solid is an organic pigment from any of the recognised classes of pigments described, for example, in the Third Edition of the Colour Index (1971) and subsequent revisions of, and supplements thereto, under the chapter headed "Pigments". Examples of organic pigments are those from the azo, disazo, trisazo, condensed azo, azo lakes, naphthol pigments, anthanthrone, anthrapyrimidine, anthraquinone, benzimidazolone, carbazole, diketopyrrolopyrrole, flavanthrone, indigoid pigments, indanthrone, isodibenzanthrone, isoindanthrone, isoindolinone, isoindoline, isoviolanthrone, metal complex pigments, oxazine, perylene, perinone, pyranthrone, pyrazoloquinazolone, quinacridone, quinophthalone, thioindigo, triarylcarbonium pigments, triphendioxazine, xanthene and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. In one embodiment, the organic pigments are phthalocyanines, especially copper phthalocyanines, monoazos, disazos, indanthrones, anthranthrones, quinacridones, diketopyrrolopyrroles, perylenes and carbon blacks.

Examples of inorganic pigments include metallic oxides such as titanium dioxide, rutile titanium dioxide and surface coated titanium dioxide, titanium oxides of different colours such as yellow and black, iron oxides of different colours such as yellow, red, brown and black, zinc oxide, zirconium oxides, aluminium oxide, oxymetallic compounds such as bismuth vanadate, cobalt aluminate, cobalt stannate, cobalt zincate, zinc chromate and mixed metal oxides of two or more of manganese, nickel, titanium, chromium, antimony, magnesium, cobalt, iron or aluminium, Prussian blue, vermillion, ultramarine, zinc phosphate, zinc sulphide, molybdates and chromates of calcium and zinc, metal effect pigments such as aluminium flake, copper, and copper/zinc alloy, pearlescent flake such as lead carbonate and bismuth oxychloride.

Inorganic solids include extenders and fillers such as ground and precipitated calcium carbonate, calcium sulphate, calcium oxide, calcium oxalate, calcium phosphate, calcium phosphonate, barium sulphate, barium carbonate, magnesium oxide, magnesium hydroxide, natural magnesium hydroxide or brucite, precipitated magnesium hydroxide, magnesium carbonate, dolomite, aluminium trihydroxide, aluminium hydroperoxide or boehmite, calcium and magnesium silicates, aluminosilicates including nanoclays, kaolin, montmorillonites including bentonites, hectorites and saponites, ball clays including natural, synthetic and expandable, mica, talc including muscovites, phlogopites, lepidolites and chlorites, chalk, synthetic and precipitated silica, fumed silica, metal fibres and powders, zinc, aluminium, glass fibres, refractory fibres, carbon black including single- and multi-walled carbon nanotubes, reinforcing and non-reinforcing carbon black, graphite, Buckminsterfullerenes, asphaltene, graphene, diamond, alumina, quartz, perlite, pegmatite, silica gel, wood flour, wood flake including soft and hard woods, saw dust, powdered paper/fibre, cellulosic fibres such as kenaf, hemp, sisal, flax, cotton, cotton linters, jute, ramie, rice husk or hulls, raffia, typha reed, coconut fibre, coir, oil palm fibre, kapok, banana leaf, caro, curaua, henequen leaf, harakeke leaf, abaca, sugar cane bagasse, straw, bamboo strips, wheat flour, MDF and the like, vermiculite, zeolites, hydrotalcites, fly ash from power plants, icinerated sewage sludge ash, pozzolanes, blast furnace slag, asbestos, chrysotile, anthophylite, crocidolite, wollastonite, attapulgite and the like, particulate ceramic materials such as alumina, zirconia, titania, ceria, silicon nitride, aluminium nitride, boron nitride, silicon carbide, boron carbide, mixed silicon-aluminium nitrides and metal titanates; particulate magnetic materials such as the magnetic oxides of transition metals, often iron and chromium, e.g., gamma-$Fe_2O_3$, $Fe_3O_4$, and cobalt-doped iron oxides, ferrites, e.g. barium ferrites; and metal particles, for instance metallic aluminium, iron, nickel, cobalt, copper, silver, gold, palladium, and platinum and alloys thereof.

Other useful solid materials include flame retardants such as pentabromodiphenyl ether, octabromodiphenyl ether, decabromodiphenyl ether, hexabromocyclododecane, ammonium polyphosphate, melamine, melamine cyanurate, antimony oxide and borates; biocides or industrial microbial agents such as those mentioned in tables 2, 3, 4, 5, 6, 7, 8 and 9 of the chapter entitled "Industrial Microbial Agents" in Kirk-Othmer's Encyclopedia of Chemical Technology, Volume 13, 1981, $3^{rd}$ Edition, and agrochemicals such as the fungicides flutriafen, carbendazim, chlorothalonil and mancozeb.

The organic medium present in the composition of the invention in one embodiment is a plastics material and in another embodiment an organic liquid. The organic liquid may be a non-polar or a polar organic liquid. By the term "polar" in relation to the organic liquid it is meant that an organic liquid is capable of forming moderate to strong bonds as described in the article entitled "A Three Dimensional Approach to Solubility" by Crowley et al in Journal of Paint Technology, Vol. 38, 1966, at page 269. Such organic liquids generally have a hydrogen bonding number of 5 or more as defined in the abovementioned article.

Examples of suitable polar organic liquids are amines, ethers, especially lower alkyl ethers, organic acids, esters, ketones, glycols, glycol ethers, glycol esters, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

In one embodiment, polar organic liquids are dialkyl ketones, alkyl esters of alkane carboxylic acids and alkanols, especially such liquids containing up to, and including, a total of 6 carbon atoms. As examples of the polar organic liquids include dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxypropyl acetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol (also known as 2-methylpropanol), terpineol and dialkyl and cyclic ethers such as diethyl ether and tetrahydrofuran. In one embodiment, solvents are alkanols, alkane carboxylic acids and esters of alkane carboxlic acids. In one embodiment, the present invention is suitable for organic liquids that are substantially non-soluble in an aqueous medium. Furthermore a person skilled in the art will appreciate that small quantities of an aqueous medium (such as glycols, glycol ethers, glycol esters and alcohols) may be present in the organic liquids provided the overall organic liquid is substantially non-soluble in an aqueous medium.

Examples of organic liquids, which may be used as polar organic liquids are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde, polyester/melamine-formaldehyde, thermosetting acrylic/melamine-formaldehyde, long oil alkyd, medium oil alkyd, short oil alkyd, polyether polyols and multi-media resins such as acrylic and urea/aldehyde.

The organic liquid may be a polyol, that is to say, an organic liquid with two or more hydroxy groups. In one embodiment, polyols include alpha-omega diols or alpha-omega diol ethoxylates.

In one embodiment, non-polar organic liquids are compounds containing aliphatic groups, aromatic groups or mixtures thereof. The non-polar organic liquids include non-halogenated aromatic hydrocarbons (e.g. toluene and xylene), halogenated aromatic hydrocarbons (e.g. chlorobenzene, dichlorobenzene, chlorotoluene), non-halogenated aliphatic hydrocarbons (e.g. linear and branched aliphatic hydrocarbons containing six or more carbon atoms both fully and partially saturated), halogenated aliphatic hydrocarbons (e.g. dichloromethane, carbon tetrachloride, chloroform, trichloroethane) and natural non-polar organics (e.g. vegetable oil, sunflower oil, rapeseed oil, linseed oil, terpenes and glycerides).

In one embodiment, the organic liquid comprises at least 0.1% by weight, or 1% by weight or more of a polar organic liquid based on the total organic liquid. The organic liquid optionally further comprises water. In one embodiment, the organic liquid is free of water.

The plastics material may be a thermosetting resin or a thermoplastic resin. The thermosetting resins useful in this invention include resins which undergo a chemical reaction when heated, catalysed, or subject to ultra-violet, laser light, infra-red, cationic, electron beam, or microwave radiation and become relatively infusible. Typical reactions in thermosetting resins include oxidation of unsaturated double bonds, reactions involving epoxy/amine, epoxy/carbonyl, epoxy/hydroxyl, reaction of epoxy with a Lewis acid or Lewis base, polyisocyanate/hydroxy, amino resin/hydroxy moieties, free radical reactions or polyacrylate, cationic polymerization of epoxy resins and vinyl ether and condensation of silanol. Examples of unsaturated resins include polyester resins made by the reaction of one or more diacids or anhydrides with one or more diols. Such resins are commonly supplied as a mixture with a reactive monomer such as styrene or vinyltoluene and are often referred to as orthophthalic resins and isophthalic resins. Further examples include resins using dicyclopentadiene (DCPD) as a co-reactant in the polyester chain. Further examples also include the reaction products of bisphenol A diglycidyl ether with unsaturated carboxylic acids such as methacrylic acid, subsequently supplied as a solution in styrene, commonly referred to as vinyl ester resins.

In one embodiment, the thermosetting composite or thermosetting plastic may be a polyester, a polyvinyl acetate, a polyester resin in styrene, a polystyrene, or mixtures thereof.

Polymers with hydroxy functionality (frequently polyols) are widely used in thermosetting systems to crosslink with amino resins or polyisocyanates. The polyols include acrylic polyols, alkyd polyols, polyester polyols, polyether polyols and polyurethane polyols. Typical amino resins include melamine formaldehyde resins, benzoguanamine formaldehyde resins, urea formaldehyde resins and glycoluril formaldehyde resins. Polyisocyanates are resins with two or more isocyanate groups, including both monomeric aliphatic diisocyanates, monomeric aromatic diisocyanates and their polymers. Typical aliphatic diisocyanates include hexamethylene diisocyanate, isophorone diisocyanate and hydrogenated diphenylmethane diisocyanate. Typical aromatic isocyanates include toluene diisocyanates and diphenylmethane diisocyanates.

In one embodiment, thermoplastic resins include polyolefins, polyesters, polyamides, polycarbonates, polyurethanes, polystyrenics, poly(meth)acrylates, celluloses and cellulose derivatives. Said compositions may be prepared in a number of ways but melt mixing and dry solid blending are typical methods. Examples of a suitable thermoplastic include (low density, or linear low density or high density) polyethylene, polypropylene, polystyrene, polyethylene terephthalate (PET), polybutylene terephthalate (PBT), nylon 6, nylon 6/6, nylon 4/6, nylon 6/12, nylon 11 and nylon 12, polymethylmethacrylate, polyethersulphone, polysulphones, polycarbonate, polyvinyl chloride (PVC), thermoplastic polyurethane, ethylene vinyl acetate (EVA), Victrex PEEK™ polymers (such as oxy-1, 4-phenylenoeoxy-1, 4-phenylene-carbonyl-1, 4-phenylene polymers) and acrylonitrile butadiene styrene polymers (ABS); and various other polymeric blends or alloys.

The compositions of the present invention may contain other ingredients, for example resins (where these do not already constitute the organic medium), binders, co-solvents, cross-linking agents, fluidising agents, wetting agents, anti-sedimentation agents, plasticisers, surfactants, dispersants other than the compound of the present invention, humectants, anti-foamers, anti-cratering agents, rheology modifiers, heat stabilizers, light stabilizers, UV absorbers, antioxidants, leveling agents, gloss modifiers, biocides and preservatives.

The compositions containing plastic material may contain other ingredients, for example dispersants other than the compound of the present invention, antifogging agents, nucleators, blowing agents, flame retardants, process aids, surfactants, plasticisers, heat stabilizers, UV absorbers, antioxidants, fragrances, mould release aids, anti-static agents, anti-microbial agents, biocides, coupling agents, lubricants (external and internal), impact modifiers, slip agents, air release agents and viscosity depressants.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid is an organic material, such as an organic pigment, in one embodiment contains from 15 to 60% by weight of the solid whereas a composition in which the solid is an inorganic material, such as an inorganic pigment, filler or extender, in one embodiment contains from 40 to 90% by weight of the solid based on the total weight of composition.

The compositions containing an organic liquid may be prepared by any of the conventional methods known for preparing dispersions. Thus, the solid, the organic medium and the dispersant may be mixed in any order, the mixture then being subjected to a mechanical treatment to reduce the particles of the solid to an appropriate size, for example by high speed mixing, ball milling, basket milling, bead milling, gravel milling, sand grinding, attritor grinding, two roll or three roll milling, plastic milling until the dispersion is formed. Alternatively, the solid may be treated to reduce its particle size independently or in admixture with either the organic medium or the dispersant, the other ingredient or ingredients then being added and the mixture being agitated to provide the composition. The composition can also be made by grinding or milling the dry solid with the dispersant and then adding the liquid medium or mixing the solid with the dispersant in a liquid medium in a pigment flushing process.

The composition containing the plastic material may be prepared by any of the conventional methods known for preparing thermoplastic compounds. Thus, the solid, the thermoplastic polymer, and the dispersant may be mixed in any order, the mixture then being subjected to a mechanical treatment to reduce the particles of the solid to an appropriate size, for example, by Banbury mixing, ribbon blending, twin-screw extrusion, twin-roll milling, compounding in a Buss co-kneader, or similar equipment.

The composition of the present invention is particularly suited to liquid dispersions. In one embodiment, such dispersion compositions comprise:

(a) from 0.5 to 80 parts of a particulate solid;
(b) from 0.1 to 79.6 parts of a polymer of formula (1); and
(c) from 19.9 to 99.4 parts of an organic liquid and/or water; wherein all relative parts are by weight and the amounts (a)+(b)+(c)=100.

In one embodiment, component a) comprises from 0.5 to 30 parts of a pigment and such dispersions are useful as (liquid) inks, paints and millbases.

If a composition is required comprising a particulate solid and a dispersant of Formula (1) in dry form, the organic liquid is typically volatile so that it may be readily removed from the particulate solid by a simple separation means such as evaporation. In one embodiment, the composition comprises the organic liquid.

If the dry composition consists essentially of the dispersant of formula (1) and the particulate solid, it typically contains at least 0.2%, at least 0.5% or at least 1.0% dispersant of formula (1) based on weight of the particulate solid. In one embodiment, the dry composition contains not greater than 100%, not greater than 50%, not greater than 20% or not greater than 10% by weight of dispersant of formula (1) based on the weight of the particulate solid.

As disclosed hereinbefore, the compositions of the invention are suitable for preparing millbases wherein the particulate solid is milled in an organic liquid in the presence of a compound for formula (1).

Thus, according to a still further aspect of the invention there is provided a millbase comprising a particulate solid, an organic liquid and a polymer of formula (1).

Typically, the millbase contains from 20 to 70% by weight particulate solid based on the total weight of the millbase. In one embodiment, the particulate solid is not less than 10 or not less than 20% by weight of the millbase. Such millbases may optionally contain a binder added either before or after milling.

In one embodiment, the binder is a polymeric material capable of binding the composition on volatilisation of the organic liquid.

Binders are polymeric materials including natural and synthetic materials. In one embodiment, binders include poly(meth)acrylates, polystyrenics, polyesters, polyurethanes, alkyds, polysaccharides such as cellulose, nitrocellulose, and natural proteins such as casein. The binder may be nitrocellulose. In one embodiment, the binder is present in the composition at more than 100% based on the amount of particulate solid, more than 200%, more than 300% or more than 400%.

The amount of optional binder in the millbase can vary over wide limits but is typically not less than 10%, and often not less than 20% by weight of the continuous/liquid phase of the millbase. In one embodiment, the amount of binder is not greater than 50% or not greater than 40% by weight of the continuous/liquid phase of the millbase.

The amount of dispersant in the millbase is dependent on the amount of particulate solid but is typically from 0.5 to 5% by weight of the millbase.

Dispersions and millbases made from the composition of the invention are particularly suitable for use in non-aqueous and solvent free formulations in which energy curable systems (ultra-violet, laser light, infra-red, cationic, electron beam, microwave) are employed with monomers, oligomers, etc or a combination present in the formulation. They are particularly suitable for use in coatings such as paints, varnishes, inks, other coating materials and plastics. Suitable examples include their use in low, medium and high solids paints, general industrial paints including baking, two component and metal coating paints such as coil and can coatings, powder coatings, UV-curable coatings, wood varnishes; inks, such as flexographic, gravure, offset, lithographic, letterpress or relief, screen printing and printing inks for packaging printing, non-impact inks such as inkjet inks including continuous inkjet and drop on demand inkjet which include thermal, piezo and electrostatic, phase change inks and hot melt wax inks, inks for ink-jet printers and print varnishes such as overprint varnishes; polyol and plastisol dispersions; non-aqueous ceramic processes, especially tape-casting, gel-casting, doctor-blade, extrusion and injection moulding type processes, a further example would be in the preparation of dry ceramic powders for isostatic pressing; composites such as sheet moulding and bulk moulding compounds, resin transfer moulding, pultrusion, hand-lay-up and spray-lay-up processes, matched die moulding; construction materials like casting resins, cosmetics, personal care like nail coatings, sunscreens, adhesives, toners such as liquid toners, plastics materials and electronic materials such as coating formulations for colour filter systems in displays including organic light-emitting diode (OLED) devices, liquid crystal displays and electrophoretic displays, glass coatings including optical fibre coatings, reflective coatings or anti-reflective coatings, conductive and magnetic inks and coatings. They are useful in the surface modification of pigments and fillers to improve the dispersibility of dry powders used in the above applications. Further examples of coating materials are given in Bodo Muller, Ulrich Poth, Lackformulierung und Lackrezeptur, Lehrbuch fr Ausbildung und Praxis, Vincentz Verlag, Hanover (2003) and in P. G. Garrat, Strahlenhartung, Vincentz Verlag, Hanover (1996). Examples of printing ink formulations are given in E. W. Flick, Printing Ink and Overprint Varnish Formulations—Recent Developments, Noyes Publications, Park Ridge N.J., (1990) and subsequent editions In one embodiment, the composition of the invention further includes one or more additional known dispersants.

The following examples provide illustrations of the invention. These examples are non-exhaustive and are not intended to limit the scope of the invention.

EXAMPLES

Dispersant Example 1 (DE1)

(±)-3-amino-1,2-propane diol (0.46 parts) and propylene glycol mono methyl ether acetate (55 parts) is stirred under nitrogen at 120° C. 1,8-naphthalic anhydride (1.00 parts) is added over 10 minutes and the mixture is stirred for a further 5 hours at 120° C. until IR analysis indicated imide/amide formation and the anhydride had been consumed. The reaction is cooled to 70° C. and added to a stirred mixture of poly(bisphenol A-co-epichlorohydrin) glycidyl end capped (Mn355, ex Aldrich) (10 parts) and Surfonamine B200 (46 parts) at 120° C. under a nitrogen atmosphere. Ethyltriphenylphosphonium iodide (0.1 g) catalyst is also added. The whole mixture is stirred at 140° C. for 6 hours under a nitrogen atmosphere gradually removing the propylene glycol mono methyl ether acetate. A pale amber hazy liquid is obtained upon allowing the mixture to cool to room temperature (55 parts).

Dispersant Example 2 (DE2)

Triethylenetetraamine (0.73 parts) and propylene glycol mono methyl ether acetate (55 parts) is stirred under nitrogen at 120° C. 1,8-Naphthalic anhydride (2.00 parts) is added over 10 minutes and the mixture is stirred for a further 2 hours at 120° C. until IR analysis indicated imide/amide formation and the anhydride had been consumed. The reaction mixture is added to a stirred mixture of poly(bisphenol A-co-epichlorohydrin) glycidyl end capped (Mn355, ex Aldrich) (10 parts) and Surfonamine B200 (46 parts) at 120° C. under a nitrogen atmosphere. The whole mixture is stirred at 140° C. for 6 hours under a nitrogen atmosphere gradually removing the propylene glycol mono methyl ether acetate. A pale amber, hazy liquid is obtained upon allowing the mixture to cool to room temperature (55 parts).

Dispersant Example 3: (DE3)

2-(2-Aminoethylamino)ethanol (0.52 parts) and propylene glycol mono methyl ether acetate (55 parts) is stirred under nitrogen at 120° C. 3-Nitro-1,8-naphthalic anhydride (1.22 parts) is added over 10 minutes and the mixture is stirred for a further 6 hours at 120° C. until IR analysis indicated imide/amide formation and the anhydride had been consumed. The reaction is cooled to 70° C. and added to a stirred mixture of poly(bisphenol A-co-epichlorohydrin) glycidyl end capped (Mn355, ex Aldrich) (10 parts) and Surfonamine L207 (46 parts) at 120° C. under a nitrogen atmosphere. Ethyltriphenylphosphonium iodide (0.1 g) catalyst is also added. The whole mixture is stirred at 140° C. for 6 hours under a nitrogen atmosphere gradually removing the propylene glycol mono methyl ether acetate (MPA). A pale amber liquid is obtained upon allowing the mixture to cool to room temperature (55 parts).

Dispersant Example 4 (DE4)

3-Nitro-1,8-Naphthalic anhydride is slurried in MPA and the mixture is stirred at 125° C. under a nitrogen atmosphere. 1,6-Diaminohexane is added and the whole mixture is stirred at 125° C. until it became clear after approximately 90 minutes. IR analysis of the mixture showed the disappearance of the anhydride with formation of imide and amide bonds. This solution is added to Surfonamine B200 and 1,4-Butanediol diglycidyl ether in a 250 ml 3 necked RB flask, and the whole mixture is stirred at 130° C. for 6 hours under a nitrogen atmosphere gradually removing the solvent. The mixture is allowed to cool to room temperature and is poured off into a glass jar to give a dark amber liquid (51 parts).

Dispersant Example 5 (DE5)

3-Nitro-1,8-Naphthalic anhydride (1.22 parts) is slurried in MPA and the mixture is stirred at 125° C. under a nitrogen atmosphere. 1,6-Diaminohexane (0.58 parts) is added and the whole mixture is stirred at 125° C. until it became clear after approximately 90 minutes. IR analysis of the mixture showed that the anhydride had completely disappeared with formation of imide and amide bonds. This solution is added to Surfonamine L207 (46 parts) and 1,4-Butanediol diglycidyl ether (5.66 parts) in a 250 ml 3 necked RB flask, and the whole mixture is stirred at 130° C. for 6 hours under a nitrogen atmosphere gradually removing the solvent. The mixture is allowed to cool to room temperature and poured off into a glass jar to give an amber liquid (51 parts).

Dispersant Example 6 (DE6)

1,8-Naphthalic anhydride (1 part) is slurried in MPA 30 parts) and the mixture is stirred at 125° C. under a nitrogen atmosphere. 1,6-Diaminohexane (0.58 parts) was added and the whole mixture is stirred at 125° C. until it became clear after approximately 1 hour. IR analysis of the mixture showed that the anhydride had completely disappeared with formation of imide and amide bonds. This solution is added to Surfonamine B100 (25 parts) and 1,4-Butanediol diglycidyl ether (5.66 parts) in a 250 ml 3 necked RB flask, and the whole mixture is stirred at 130° C. for 6 hours under a nitrogen atmosphere gradually removing the solvent. The mixture is allowed to cool to room temperature and poured off into a glass jar to give a hazy, viscous liquid (30 parts).

Dispersant Example 7 (DE7)

Ethylenediamine (6 parts) and ethanol (50 parts) is stirred under nitrogen at 80° C. 3-Nitro-1,8-naphthalic anhydride (3 parts) is added over 10 minutes and the mixture is stirred for a further 2 hours at 80° C. until IR analysis indicated imide/amide formation and the anhydride had been consumed. The reaction mixture is filtered and the collected white solid is air dried (3.1 parts 88%). This solid (1.43 parts) is dissolved in 2-pyrrolidinone (10 parts) and this solution is added to Surfonamine L207 (46 parts) and 1,4-Butanediol diglycidyl ether (5.66 parts) in a 250 ml 3 necked RB flask, and the whole mixture is stirred at 130° C. for 6 hours under a nitrogen atmosphere. The mixture is allowed to cool to room temperature and poured off into a glass jar to give a dark amber liquid (61 parts).

Dispersant Example 8 (DE8)

2,3-Naphthalic anhydride (1 part) is slurried in MPA and the mixture is stirred at 125° C. under a nitrogen atmosphere. 1,6-Diaminohexane (0.58 parts) is added and the whole mixture is stirred at 125° C. until it became clear after approximately 4 hours. IR analysis of the mixture showed the disappearance of the anhydride with formation of imide and amide bonds. This solution is added to Surfonamine L200 (50 parts) and 1,4-Butanediol diglycidyl ether (6.1 parts) in a 250 ml 3 necked RB flask, and the whole mixture is stirred at 130° C. for 6 hours under a nitrogen atmosphere. The mixture is allowed to cool to 50° C. and water (57 parts) is added to dissolve the polymer, a dark amber liquid is obtained (114 parts).

Dispersant Example 9 (DE9)

1,8-Naphthalic anhydride (2 parts) is slurried in MPA (30 parts) and the mixture is stirred at 125° C. under a nitrogen atmosphere. 1,6-Diaminohexane (1.16 parts) is added and the whole mixture is stirred at 125° C. until it became clear after approximately 1 hour. IR analysis of the mixture showed the disappearance of the anhydride with formation of imide and amide bonds. This solution is added to Surfonamine L207 (92 parts) and 1,4-Cyclohexanedimethanol diglycidyl ether (14.36 parts) in a 250 ml 3 necked RB flask, and the whole mixture is stirred at 130° C. for 6 hours under a nitrogen atmosphere gradually removing the solvent. The mixture is allowed to cool to 50° C. and water (110 parts) is added to dissolve the polymer. This solution is filtered to give a pale yellow liquid (220 parts).

Dispersant Example 10 (DE10)

1,8-Naphthalic anhydride (2 parts) is slurried in MPA (50 parts) and the mixture is stirred at 125° C. under a nitrogen atmosphere. 1,6-Diaminohexane (1.16 parts) is added and the whole mixture is stirred at 125° C. until it became clear after approx. 90 minutes. IR analysis of the mixture showed that the anhydride had completely disappeared with formation of imide and amide bonds. This solution is added to a mixture of PAG 24A (40 parts), 2-(2-aminoethoxy)ethanol (2.74 parts) and 1,4-Butanediol diglycidyl ether (11.35 parts) in a 250 ml 3 necked RB flask, and the whole mixture is stirred at 130° C. for 6 hours under a nitrogen atmosphere gradually removing the solvent. The mixture is allowed to cool to room temperature and poured off into a glass jar, a viscous, hazy, amber liquid is obtained (56 parts).

Dispersant Example 11 (DE11)

DE10 (20 parts) is added to caprolactone (4 parts) and 12-hydroxystearic acid (10.3 parts) and the whole mixture is stirred at 100° C. under a nitrogen atmosphere. Zirconium butylate (0.3 parts) is added and the whole mixture is stirred at 180° C. for 6 hours to give an amber liquid (30 parts) upon cooling.

Comparative Dispersant 1 (CE1):

A mixture of poly(bisphenol A-co-epichlorohydrin) glycidyl end capped (Mn355, ex Aldrich) (10 parts) and Surfonamine B200 (46 parts) is stirred at 140° C. under a nitrogen atmosphere for 6 hours under a nitrogen atmosphere. A pale amber liquid is obtained upon allowing the mixture to cool to room temperature (54 parts).

Comparative Dispersant 2 (CE2):

A mixture of poly(bisphenol A-co-epichlorohydrin) glycidyl end capped (Mn355, ex Aldrich) (10 parts) and Surfonamine L207 (46 parts) is stirred at 140° C. under a nitrogen atmosphere for 6 hours under a nitrogen atmosphere. A pale amber liquid is obtained upon allowing the mixture to cool to room temperature (54 parts).

Comparative Dispersant 3 (CE3):

A mixture of poly(bisphenol A-co-epichlorohydrin) glycidyl end capped (Mn355, ex Aldrich) (10 parts) and Surfonamine B200 (56.3 parts) is stirred at 140° C. under a nitrogen atmosphere for 6 hours under a nitrogen atmosphere. A pale amber liquid is obtained upon allowing to cool to room temperature (64 parts).

Comparative Dispersant 4 (CE4):

Surfonamine L207 (46 parts) and 1,4-Butanediol diglycidyl ether (5.66 parts) is added into a 250 ml 3 necked RB flask, and the whole mixture is stirred at 130° C. for 6 hours under a nitrogen atmosphere. The mixture is allowed to cool to room temperature and poured off into a glass jar to give an amber liquid (50 parts).

Dispersion Test 1

Dispersions are prepared by dissolving dispersants (1.75 parts) in propylene glycol mono methyl ether acetate (MPA) (6.25 parts). Glass beads (3 mm diameter, 17 parts) and black pigment (2.0 parts Raven 5000 Ultra ex Columbia chemicals) are added and the contents milled on a horizontal shaker for 16 hours. The resulting dispersions are fluid liquids. In the absence of dispersant (control contained 8 parts of MPA), the dispersion formed an immovable gel. The resulting mill bases (0.5 parts) are letdown into acrylic resin (2 parts, Macrynal SMC565 ex Solutia) and coated onto B/W card using a number 4 K-bar. The resulting coatings are high gloss and low haze with no evidence of flocculation whereas in the absence of dispersant the coating is low gloss and high haze. Higher gloss and lower haze results are also achieved by incorporating the aromatic imide groups into the polyepoxide amine structure. Tinctorial properties are measured using a Byk Gardner gloss meter and shown below.

| Dispersant in letdown | 60° gloss of coating | 20° gloss of coating | Haze of coating |
| --- | --- | --- | --- |
| Control | 69.8 | 40.1 | 381 |
| CE1 | 89.7 | 79.4 | 79 |
| CE3 | 90.9 | 80.2 | 75 |
| DE1 | 90.9 | 84.1 | 48 |
| DE2 | 93.5 | 87.5 | 24 |

Footnote:
control is a millbase without dispersant.

Dispersion Test 2

A dispersion is prepared by dissolving Dispersant Example DE3, 5 and 7-9 (0.9 parts) each in water (7.6 parts) with antifoam (0.01 parts, BYK024 ex Byk Chemie). 3 mm glass beads (17.0 parts) and Pigment Violet 19 (1.5 parts, Inkjet Magenta E5B02 ex Clariant) is added and the contents milled on a horizontal shaker for 16 hrs. The resulting fluid dispersion (2.5 parts) are let down into an ink solution (10 parts). The ink solution is previously prepared by adding 2-pyrrolidinone (2.33 parts), 1,5-pentanediol (5.83 parts), glycerol (11.66 parts) and wetting agent (0.58 parts, Tego Wet %10 ex Evonik) to distilled water (74.6 parts). The particle sizes (PS) are measured for each ink giving D50 ($PS^1$) and D90 ($PS^2$) values and these are determined using a Nanotrac particle size analyser. The inks are stored in an oven at 40 C for 4 weeks and the particle size stability for each ink is assessed by obtaining the particle sizes D50 ($PS^3$) and D90 ($PS^4$) of each ink again. The resulting inks of the inventive dispersants show reduced particle sizes and improved particle size stability over time. The results obtained are:

| Example | $PS^1$ | $PS^2$ | $PS^3$ | $PS^4$ |
| --- | --- | --- | --- | --- |
| CE2 | 226 | 447 | 518 | 878 |
| CE4 | 225 | 404 | 670 | 1000 |
| DE3 | 159 | 272 | 215 | 416 |
| DE5 | 182 | 301 | 225 | 404 |
| DE7 | 164 | 306 | 196 | 303 |
| DE8 | 164 | 344 | 165 | 283 |
| DE9 | 147 | 331 | 170 | 310 |

Dispersion Test 3

Dispersion are prepared by dissolving each Dispersant Example DE4, 6, 9, 11 and CE1 (based on 0.45 parts, 100% active) in toluene (6.55 parts). 3 mm glass beads (17 parts) and Monolite Rubine 3B pigment (2.0 parts, Pigment Red 122 ex Heubach) are then added to each solution and the contents milled on a horizontal shaker for 16 hrs. The viscosity is assessed by determining the freedom of the glass beads to move throughout the mill base. In all cases except where no agent is present, the pigment wetted out and a homogeneous dispersion is formed. The viscosity of the resulting dispersion is assessed using an arbitrary scale of A to E (good to poor). The results are given below which clearly illustrates that the dispersant of the invention produce superior more fluid dispersions. The results obtained are:

| Example | Viscosity Rating |
| --- | --- |
| No Agent Control | E |
| CE1 | C |
| DE4 | A |
| DE6 | B |
| DE10 | B |
| DE11 | B |

Overall, the results presented above indicate that the dispersants of the invention provide at least one of improving colour strength, increasing a particulate solid load, forming improved dispersions, having improved brightness, and producing a composition with reduced viscosity in an organic or aqueous medium.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the basic, essential and novel characteristics of the composition or method under consideration.

As described hereinafter the number average molecular weight of the polymer of the present invention has been determined using known methods, such as GPC analysis using a polystyrene standard for all polymer chains except those that contain ethylene oxide. The number average molecular weight of a polymer chain containing ethylene oxide is determined by GPC (THF eluent, PEG Standards).

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

As used herein the term "hydrocarbylene" is used in the ordinary sense of the term and is intended to include any divalent radical formed by removing two hydrogen atoms from a hydrocarbon.

As used herein the term "alk(en)ylene" is used in the ordinary sense of the term and is intended to include an alkylene and/or an alkenylene group.

While the invention has been explained in relation to its embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A polymer represented by Formula (1):

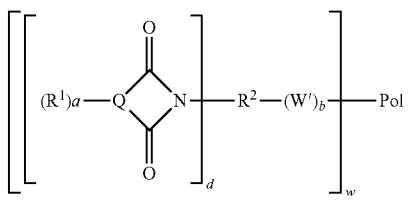

Formula (1)

wherein dispersant of Formula (1) has a terminal and/or pendant imide group, wherein the side chain imide group is derived from an imide compound represented by Formula (1a):

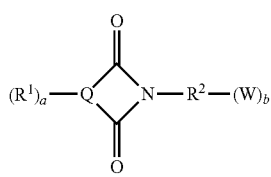

Formula (1a)

wherein
$R^1$ is a substituent on Q ring in any position available for bonding to a substituent group and $R_1$ is independently represented by one or more of —H, or an electron withdrawing group selected from the group of: —$NO_2$, —$SO_2NR'_2$, —C(O)R', —$SO_3M$, halo, —$NH_2$, and —OR' or an electron releasing alkyl group, a is the total number of sites on the Q ring available for bonding a H, electron withdrawing groups, and electron releasing groups, when $R^1$ is said electron withdrawing group or said alkyl group, then the total number of electron withdrawing and alkyl groups is 1 or 2; M is H, a metal cation, $NR'_4{}^+$, or mixtures thereof; R' is —H, an optionally-substituted alkyl containing 1 to 20 carbon atoms, and the substituent is hydroxyl or halo or mixtures thereof;

Q is a fused or non-fused aromatic ring containing 4n+2 π-electrons, wherein n=1 or more, and Q is bonded to the imide group in such a way to form a 5 or 6 membered imide ring;

$R^2$ is a $C_1$ to $C_{20}$ hydrocarbylene group or mixtures thereof; $R^2$ optionally includes oxygen and/or nitrogen atoms wherein there is at least 2 carbon atoms per every oxygen or nitrogen of $R^2$ these would include ether, ester, and amide type linkages in $R^2$;

Pol is a residue of a diepoxide or polyepoxide further comprising at least one pendant side chain of one or more of:
a polyether,
a polyester,
a mixed polyether/polyester pendant side chains thereof,
a mixed polyester/polyether pendant side chains thereof,
or mixtures thereof,
the bond(s) between Pol and each W' allows for one or more terminal and/or pendant side chain imide groups (as defined by w) to be attached to Pol at one or more locations on Pol and for each imide group to be attached to Pol by one or more bond (as defined by b);

W is any group capable of reaction with an epoxide group;
W' represents amino, carboxylic acid and hydroxyl with the H missing and is a residue of the reaction of an amino, hydroxyl or carboxyl group, with a diepoxide or polyepoxide in a reaction forming a chemical bond between an amino, hydroxy, or carboxyl group with an epoxide; when b is 2 then one of the W' is derived from a secondary amine reacted with said epoxide and optionally is in the $R^2$ linking group between the imide and the other W' group, when b is 2 each W' group is the same or different;

b is 1 or 2 and when b is 1, the imide group can either be terminal and attached to the Pol by one chemical bond when W is hydroxyl or carboxylic acid, or a pendant side chain when W is $NH_2$ and when b is 2 the imide group is a side chain attached to Pol by two chemical bonds;

d is 1, 2, or 3; this means that there is the possibility of 1 to 3 imide groups attached to $R^2$ at different carbon atoms of $R^2$; and w is 1 or more.

2. The polymer of claim 1, wherein n is 2, and Q is based upon 1,8-naphthalene anhydride, or 1,2-naphthalene anhydride.

3. The polymer of claim 1, wherein the fused aromatic ring is based on 1,8-naphthalene imide, or 1,2-naphthalene imide or mixtures thereof.

4. The polymer of claim 1, wherein Q is based on a naphthalene imide selected from the group of: 4-nitro-1,8-naphthalic imide (when one $R^1$=$NO_2$), 3-nitro-1,8-naphthalic imide (when one $R^1$=$NO_2$), 4-chloro-1,8-naphthalic imide (when one $R^1$=Cl), 3-sulpho-1,8-naphthalic imide (when one $R^1$=$SO_3H$), and mixtures thereof.

5. The polymer of claim 1, wherein the polymer is obtained/obtainable by a process comprising addition polymerisation by reacting:
(a) at least one compound of Formula (1a) wherein when b=1, W is a primary amine (—$NH_2$) giving pendant imide groups and/or W is a hydroxyl or carboxylic acid, giving a terminal end imide group, and/or when b=2, W is a secondary amino group (—NH—), hydroxyl or carboxylic acid or mixtures thereof giving a pendant imide group,
(b) with one or more diepoxide and/or polyepoxide and at least one member of the group consisting of a monofunctional polyetheramine of number average MW 250-3500, based on a polyether comprising units of $C_{2-8}$ alkylene oxides or any combination thereof to give pendant polyether chains; and optionally
(c) in the presence of at least one member of a $C_{3-28}$ hydrocarbyl amine which is substituted; or at least one of an aminoalcohol; or a mixture thereof.

6. The polymer of claim 5, wherein the polymer is prepared by further specifying one or more steps to further react any residual amino, hydroxyl, or epoxy groups including:
a) reacting any terminal amino groups present with isocyanates, lactones, hydroxycarboxylic acids, anhydrides, cyclic carbonates, or (meth)acrylates;
b) salification and/or reaction of any amino groups with mono or polycarboxylic acids, mineral acids, phosphorus and polyoxometallate containing acids or strong acids;
c) oxidation of any amino groups present to nitrogen oxides;

d) quaternization of any amino groups present with alkylating agents;

e) reacting any hydroxyl groups present with isocyanates, phosphoric acid, polyphosphoric acid, anhydrides or carboxylic acids;

f) reacting any terminal epoxide groups present with secondary amines or carboxylic acids;

g) reacting any residual primary hydroxyl and amino groups present with lactones, hydroxycarboxylic acids, modified polyester isocyanate or any combination thereof to form pendant polyester chains, and optionally further reacting the hydroxyl end group of the polyester chains derived from lactones and/or hydroxycarboxylic acids with modified polyether isocyanate to form block polyether/polyester pendant chains; or reacting any hydroxyl and amino groups present with ethylene oxide, propylene oxide, butylene oxide, styrene oxide, modified polyether isocyanate or any combination thereof to form pendant polyether chains, and optionally further reacting the hydroxyl end group of the polyether chains derived from ethylene oxide, propylene oxide, butylene oxide, styrene oxide or mixtures thereof with modified polyester isocyanate to form block polyester/polyether pendant chains;

h) blending said addition polymer with a $C_{3-28}$ hydrocarbyl alkoxylate derived or obtainable from ethylene oxide, propylene oxide, butylene oxide, styrene oxide or mixtures thereof;

i) or any combination of a)-h) thereof.

7. The polymer of claim 6, wherein the polymer is prepared by further specifying one or more steps to further react any residual amino, hydroxyl, or epoxy groups including at least one other step chosen from a), c), d), e), f) or g).

8. The polymer of claim 1, wherein the polymer is obtained/obtainable by a process comprising addition polymerisation by reacting:

(a) at least one compound of Formula (1a) wherein when b=1, W is a primary amine (—NH$_2$) giving pendant imide groups and/or W is a hydroxyl or carboxylic acid, giving a terminal end imide group, and/or when b=2, W is a secondary amino group (—NH—), hydroxyl or carboxylic acid or mixtures thereof giving a pendant imide group, (b) with one or more diepoxide and/or polyepoxide and at least one member of a $C_{3-28}$ hydrocarbyl amine which is substituted; or at least one of an aminoalcohol; or a mixture thereof; and either or both of:

(c) reacting any residual primary hydroxyl and amino groups present from step (b) with lactones, hydroxycarboxylic acids, modified polyester isocyanate or any combination thereof to form pendant polyester chains, and optionally further reacting the hydroxyl end group of the polyesters chains derived from lactones and/or hydroxycarboxylic acids with modified polyether isocyanate to form block polyether/polyester pendant chains; or (d) reacting any hydroxyl and amino groups from step (b) with ethylene oxide, propylene oxide, butylene oxide, styrene oxide, modified polyether isocyanate or any combination thereof to form pendant polyether chains, and optionally further reacting the hydroxyl end group of the polyether chains derived from ethylene oxide, propylene oxide, butylene oxide, styrene oxide or mixtures thereof with modified polyester isocyanate to form block polyester/polyether pendant chains.

9. The polymer of claim 8, wherein the polymer is prepared by further specifying one or more steps to further react any residual amino, hydroxyl, or epoxy groups including:

a) reacting any terminal amino groups present with isocyanates, anhydrides, cyclic carbonates, or (meth)acrylates;

b) salification and/or reaction of any amino groups with mono or polycarboxylic acids, mineral acids, phosphorus and polyoxometallate containing acids or strong acids;

c) oxidation of any amino groups present to nitrogen oxides;

d) quaternization of any amino groups present with alkylating agents;

e) reacting any hydroxyl groups present with isocyanates, phosphoric acid, polyphosphoric acid, anhydrides or carboxylic acids;

f) reacting any terminal epoxide groups present with secondary amines or carboxylic acids;

g) blending said addition polymer with a $C_{3-28}$ hydrocarbyl alkoxylate derived or obtainable from ethylene oxide, propylene oxide, butylene oxide, styrene oxide, or mixtures thereof h) or any combination thereof.

10. A composition comprising a particulate solid, a polymer chain having at least one aromatic imide group, wherein the polymer is represented by a polymer of claim 1, and a medium selected from a polar organic medium, an aqueous medium, and a non-polar organic medium.

11. The composition of claim 10, wherein said medium comprises a polar organic medium.

12. The composition of claim 10, wherein said medium comprises an aqueous medium.

13. The composition of claim 10, wherein the composition is a millbase, paint or ink.

14. The composition of claim 10, wherein the particulate solid is a pigment or a filler.

15. The composition of claim 10, further comprising a binder.

16. The composition of claim 10, wherein the polymer is present in an amount ranging from 0.5 wt % to 30 wt % of the composition.

17. The composition of claim 10, wherein said medium comprises a non-polar organic medium.

18. The polymer of claim 1, wherein n is 2, and one or two $R^1$ groups on each Q ring is the electron withdrawing group $NO_2$.

* * * * *